(12) United States Patent
Mitsuo et al.

(10) Patent No.: US 11,104,387 B2
(45) Date of Patent: Aug. 31, 2021

(54) STEERING SUPPORT STRUCTURE

(71) Applicant: TOYOTA JIDOSHA KABUSHIKI KAISHA, Aichi-ken (JP)

(72) Inventors: Tetsu Mitsuo, Nisshin (JP); Masaya Ikeda, Nisshin (JP); Yukihiko Nakagawa, Nisshin (JP); Osamu Okitsu, Mishima (JP); Yuuichi Suzue, Hadano (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 160 days.

(21) Appl. No.: 16/575,396

(22) Filed: Sep. 19, 2019

(65) Prior Publication Data

US 2020/0094883 A1 Mar. 26, 2020

(30) Foreign Application Priority Data

Sep. 21, 2018 (JP) .............................. JP2018-177182

(51) Int. Cl.
*B62D 25/14* (2006.01)
*B62D 1/16* (2006.01)

(52) U.S. Cl.
CPC ............. *B62D 25/145* (2013.01); *B62D 1/16* (2013.01)

(58) Field of Classification Search
CPC ................................ B62D 25/145; B62D 1/16
See application file for complete search history.

(56) References Cited

U.S. PATENT DOCUMENTS

| 2012/0049574 | A1 | | 3/2012 | Atsumi et al. | |
|---|---|---|---|---|---|
| 2020/0094881 | A1 | * | 3/2020 | Mitsuo | ...... B62D 1/16 |
| 2020/0094882 | A1 | * | 3/2020 | Mitsuo | ............ B62D 25/145 |
| 2020/0122778 | A1 | * | 4/2020 | Werneke | ............ B62D 25/145 |
| 2020/0189661 | A1 | * | 6/2020 | Kong | .................. B62D 1/19 |

FOREIGN PATENT DOCUMENTS

| DE | 102010014533 | A1 | * | 10/2011 | ........... B62D 25/145 |
|---|---|---|---|---|---|
| JP | 2012-46002 | A | | 3/2012 | |
| JP | 2017-24471 | A | | 2/2017 | |
| JP | 2017154597 | A | * | 9/2017 | ........... B62D 25/145 |
| WO | WO-2008034522 | A1 | * | 3/2008 | ........... B62D 25/145 |

* cited by examiner

*Primary Examiner* — Faye M Fleming
(74) *Attorney, Agent, or Firm* — Hauptman Ham, LLP

(57) ABSTRACT

The instrument panel reinforcement includes a column attachment portion, a side end portion, and an inclined portion. The side end portion is fixed to a front lower pillar. The inclined portion is provided between the column attachment portion and the side end portion, extends toward an inner side in the vehicle width direction and toward a rear side in a vehicle front and rear direction from a bent portion at an inner end in the vehicle width direction of the side end portion, and is connected to the column attachment portion. A cowl to brace has a rear end fixed to the bent portion of the instrument panel reinforcement.

4 Claims, 18 Drawing Sheets

CROSS-SECTIONAL VIEW TAKEN ALONG LINE B-B
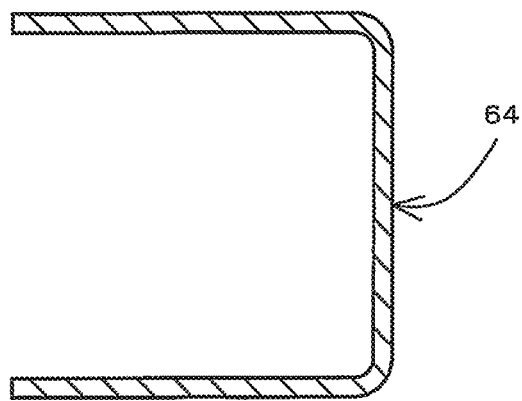
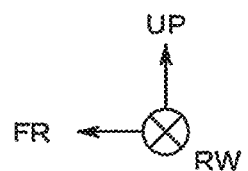
FIG. 5

CROSS-SECTIONAL VIEW TAKEN ALONG LINE G-G
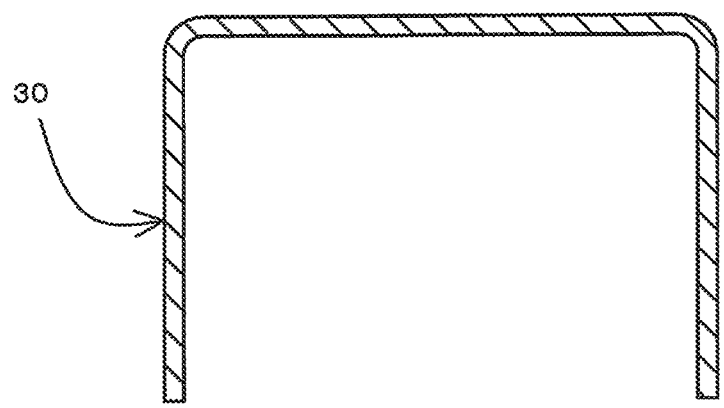
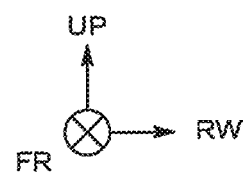
FIG. 15

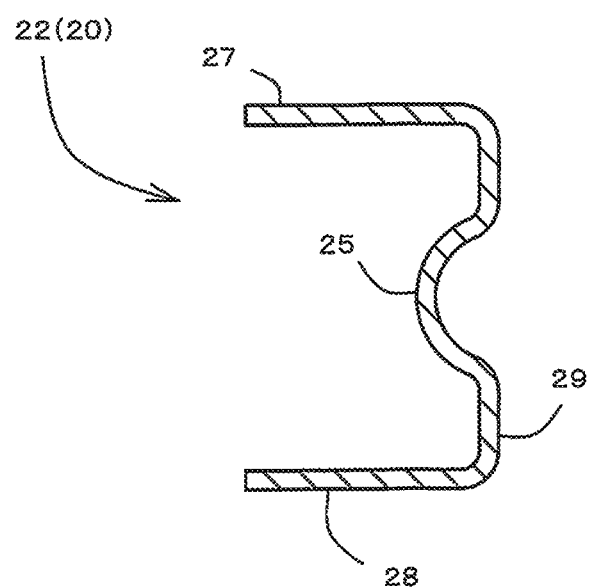
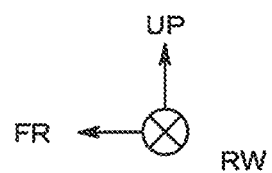
FIG. 16

STEERING SUPPORT STRUCTURE

CROSS REFERENCE TO RELATED APPLICATION

This application claims priority to Japanese Patent Application No. 2018-177182, filed on Sep. 21, 2018, which is incorporated herein by reference in its entirety.

TECHNICAL FIELD

The present disclosure relates to a steering support structure for a vehicle.

BACKGROUND

Vehicles are provided with an instrument panel reinforcement serving as a steering support structure for the vehicle. For example, FIG. 18 exemplarily illustrates an instrument panel reinforcement 200 disclosed in JP 2012-46002 A. The instrument panel reinforcement 200 is a pipe member extending in a vehicle width direction, and having both ends fixed to frame members such as front pillars 202, 202.

Furthermore, a cowl to brace 204 and a floor brace 206 are attached to the instrument panel reinforcement 200. The cowl to brace 204 is a reinforcing member extending in a vehicle front and rear direction, and having a front end fixed to a cowl panel 208 of the vehicle and a rear end fixed to the instrument panel reinforcement 200. The floor brace 206 is a reinforcing member extending in a vehicle upper and lower direction, and having an upper end fixed to the instrument panel reinforcement 200 and a lower end fixed to a floor tunnel (not illustrated).

A steering column 210 is attached to the instrument panel reinforcement 200 via a steering bracket 209. The steering column 210 has a rear end in the vehicle front and rear direction provided with a steering wheel 212.

Lower support rigidity of the steering wheel 212 (so-called steering support rigidity) leads to vibration of the steering wheel 212 due to vehicle vibration, for example, resulting in difficulty in steering operations. The instrument panel reinforcement 200 as a steering support member to mainly supports (struts) the steering wheel 212 in the vehicle width direction. The floor brace 206 mainly supports the steering wheel 212 in the vehicle upper and lower direction (via the instrument panel reinforcement 200). Furthermore, the cowl to brace 204 mainly supports the steering wheel 212 in the vehicle front and rear direction (via the instrument panel reinforcement 200).

SUMMARY

The present disclosure aims to provide a steering support structure capable of improving the steering support rigidity in the vehicle width direction.

The present disclosure relates to a steering support structure. The structure includes an instrument panel reinforcement and a brace. The instrument panel reinforcement supports a steering column and has both ends in a vehicle width direction fixed to frame members of a vehicle. The brace extends in a vehicle front and rear direction and has a front end fixed to a panel member of a vehicle body and a rear end fixed to the instrument panel reinforcement. The instrument panel reinforcement includes a column attachment portion, a side end portion, and an inclined portion. The column attachment portion extends in the vehicle width direction, and the steering column is attached thereto. The side end portion extends in the vehicle width direction and has an outer end in the vehicle width direction fixed to one of the frame members. The inclined portion is provided between the column attachment portion and the side end portion, extends toward an inner side in the vehicle width direction and toward a rear side in the vehicle front and rear direction from a bent portion at an inner end in the vehicle width direction of the side end portion, and is connected to the column attachment portion. The brace has a rear end fixed to the bent portion of the instrument panel reinforcement.

According to the above disclosure, the inclined portion and the side end portion of the instrument panel reinforcement and the brace form a so-called Y-shaped structure. Thus, a load in the vehicle width direction input to the instrument panel reinforcement is transmitted to the inclined portion and is branched at the bent portion to be distributed to the side end portion and to the brace. With the load thus distributed, the support rigidity (load capacity) of the steering support structure in the vehicle width direction is improved.

Furthermore, in the above disclosure, the inclined portion of the instrument panel reinforcement may extend in a direction closer to a vehicle width axis than to a vehicle longitudinal axis in plan view.

With the inclined portion extending in the direction closer to the vehicle width axis than to the vehicle longitudinal axis, a larger component force is input to the side end portion of the instrument panel reinforcement as compared with that input to the brace. The front end of the brace is fixed to the panel member of the vehicle body, whereas the side end portion of the instrument panel reinforcement is fixed to the frame member having higher rigidity than the panel member. Thus, the larger component force is transmitted to a member with a relatively high rigidity.

Furthermore, in the above disclosure, the inclined portion and the side end portion of the instrument panel reinforcement as well as the bent portion may be parts of a single member having a squarish U-shaped cross section.

With the inclined portion and the side end portion of the instrument panel reinforcement being parts of a single member having a squarish U-shaped cross section, the bent portion can be formed more easily than in case where the bent portion is formed by performing a bending process on a pipe member having a circular cross section involving a risk such as crushing of the pipe.

With the present disclosure, a steering support structure capable of improving the steering support rigidity in the vehicle width direction can be provided.

BRIEF DESCRIPTION OF DRAWINGS

The present disclosure will be further described with reference to the accompanying drawings, wherein like reference numerals refer to like parts in the several views, and wherein:

FIG. 5 is a cross-sectional view taken along line B-B in FIG. 2;

FIG. 15 is a cross-sectional view taken along line G-G in FIG. 2;

FIG. 16 is a cross-sectional view taken along line H-H in FIG. 2;

DESCRIPTION OF EMBODIMENTS

Figure 1:
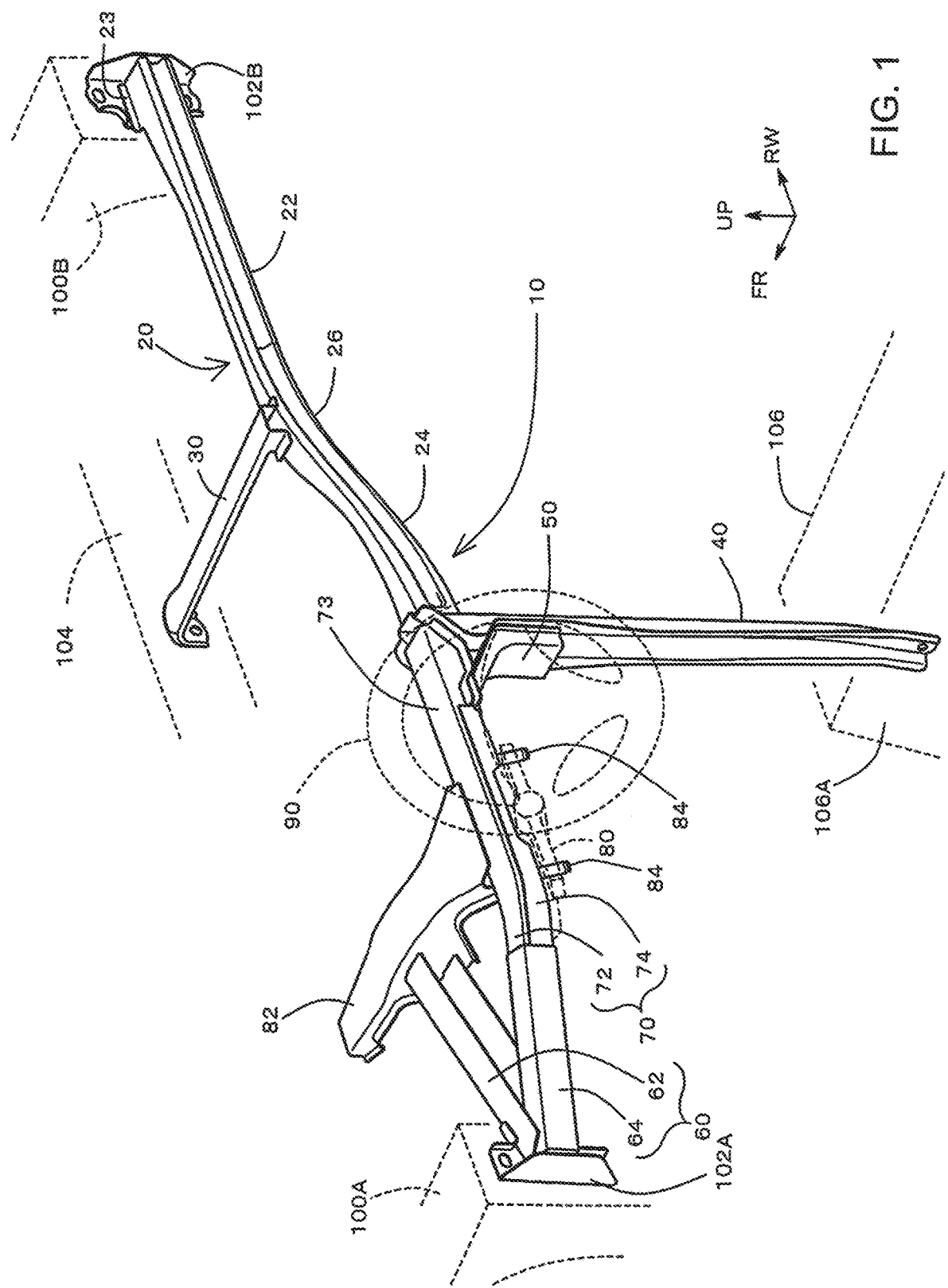
FIG. 1 is a diagram exemplarily illustrating a steering support structure according to the present embodiment.

FIG. 1 illustrates a steering support structure according to the present embodiment. In FIGS. 1 to 17, an axis denoted by a sign FR, an axis denoted by a sign RW, and an axis denoted by a sign UP respectively represents a front and rear direction, a width direction, and a vehicle upper and lower direction. The sign FR is an abbreviation of Front. A vehicle forward direction is assumed to be the positive direction on the vehicle longitudinal axis FR. The sign RW is an abbreviation of Right Width. A right width direction is assumed to be the positive direction on the vehicle width axis RW. An upward direction is assumed to be the positive direction on the vehicle upper and lower axis UP. As illustrated in FIG. 1, the vehicle longitudinal axis (FR axis), the vehicle width axis (RW axis), and the vehicle upper and lower axis (UP axis) are orthogonal to each other.

Figure 2:
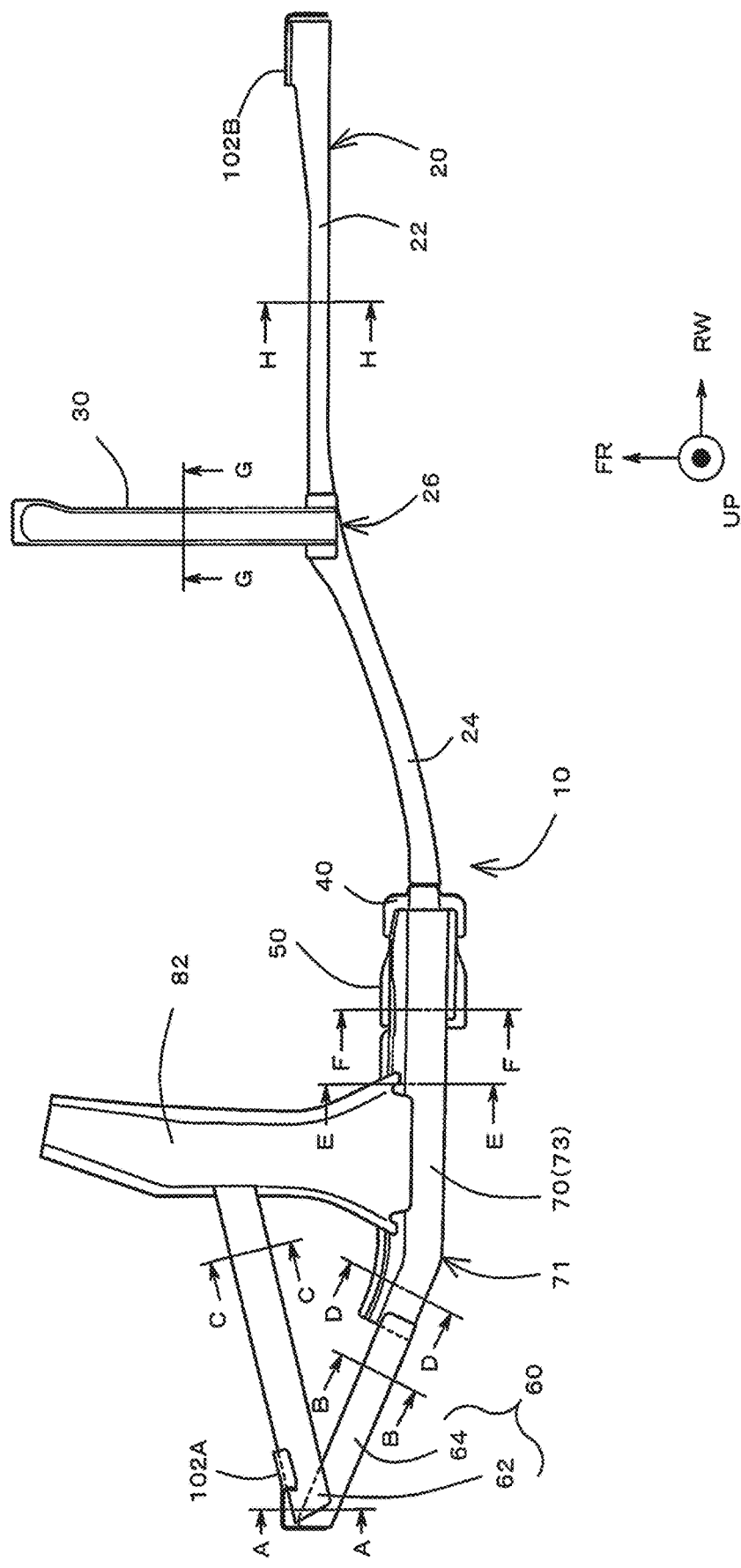
FIG. 2 is a plan view exemplarily illustrating the steering support structure according to the present embodiment.

FIG. 1 is a perspective view of a steering support structure for a left-hand drive vehicle, and FIG. 2 is a plan view of the same. An instrument panel separating a steering wheel 90 and the steering support structure from each other is omitted in the figure.

The steering support structure according to the present embodiment includes an instrument panel reinforcement 10, a steering bracket 82, a cowl to brace 30, and a floor brace 40.

The instrument panel reinforcement 10 according to the present embodiment supports a steering column 80, and has both ends, in the vehicle width direction, fixed to a vehicle frame member. For example, the instrument panel reinforcement 10 has both ends, in the vehicle width direction, fastened to front lower pillars 100A and 100B, serving as the frame members, via pillar brackets 102A and 102B. With both ends of the instrument panel reinforcement 10 in the vehicle width direction fixed to the frame members, the instrument panel reinforcement 10 mainly supports the steering column 80 in the vehicle width direction.

The instrument panel reinforcement 10 is fixed to the floor brace 40 and the cowl to brace 30. As described later, the instrument panel reinforcement 10 is supported by the floor brace 40 in the vehicle upper and lower direction. The instrument panel reinforcement 10 is supported by the cowl to brace 30 in the vehicle front and rear direction.

Furthermore, as described later, the cowl to brace 30 is fixed to the instrument panel reinforcement 10 at a bent portion 26, so that a so-called Y-shaped structure is formed by a inclined portion 24 and a side end portion 22 of the instrument panel reinforcement 10 and the cowl to brace 30. With this structure, the load input to the inclined portion 24 is distributed to the cowl to brace 30 and the side end portion 22.

The instrument panel reinforcement 10 according to the present embodiment is not a single member such as a conventional tuboid pipe, and includes a plurality of members (parts). Specifically, the instrument panel reinforcement 10 includes a P seat beam 20, a D seat first beam 60, a D seat second beam 70 (column attachment portion), and a gusset 50.

<Structure Around D Seat>

A structure of the instrument panel reinforcement 10 around the drivers seat (D seat) will be described with reference to FIG. 1 to FIG. 8 The instrument panel reinforcement 10 includes the D seat first beam 60 and the D seat second beam 70 as members around the D seat. The D seat first and second beams 60 and 70 extend substantially in the vehicle width direction, with a ridgeline, where a load is mainly received (struts), extending substantially in the vehicle width direction. The D seat first beam 60 is disposed on the outer side in the vehicle width direction, and the D seat second beam 70 is disposed on the inner side in the vehicle width direction.

Figure 3:
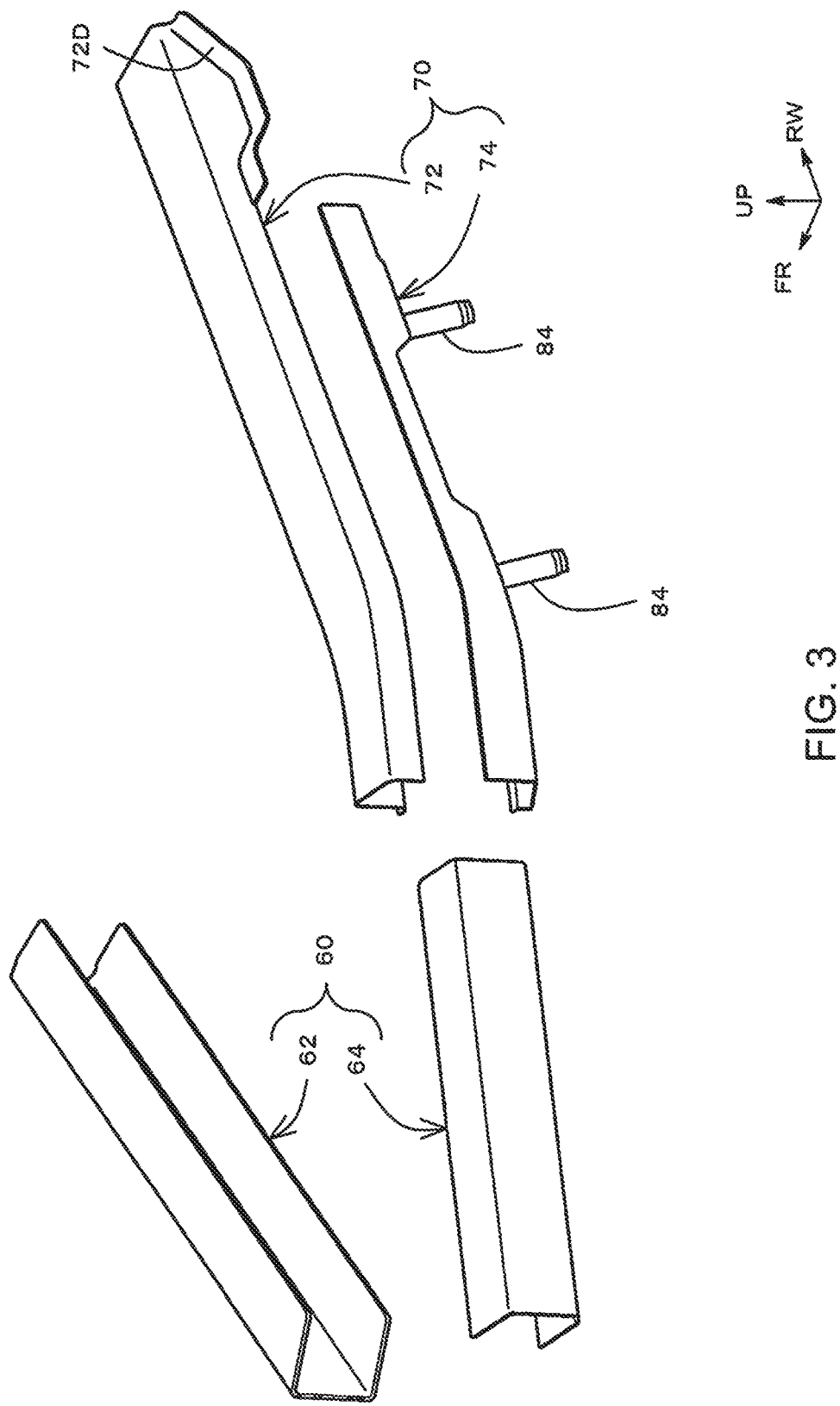
FIG. 3 is an exploded perspective view exemplarily illustrating members forming a D seat beam in the instrument panel reinforcement according to the present embodiment.

Referring to FIGS. 2 and 3, the D seat first beam 60 includes a D seat first front beam 62 and a D seat first rear beam 64. The D seat first front beam 62 is disposed further on the front side than the D seat first rear beam 64 in the vehicle front and rear direction.

Figure 4:
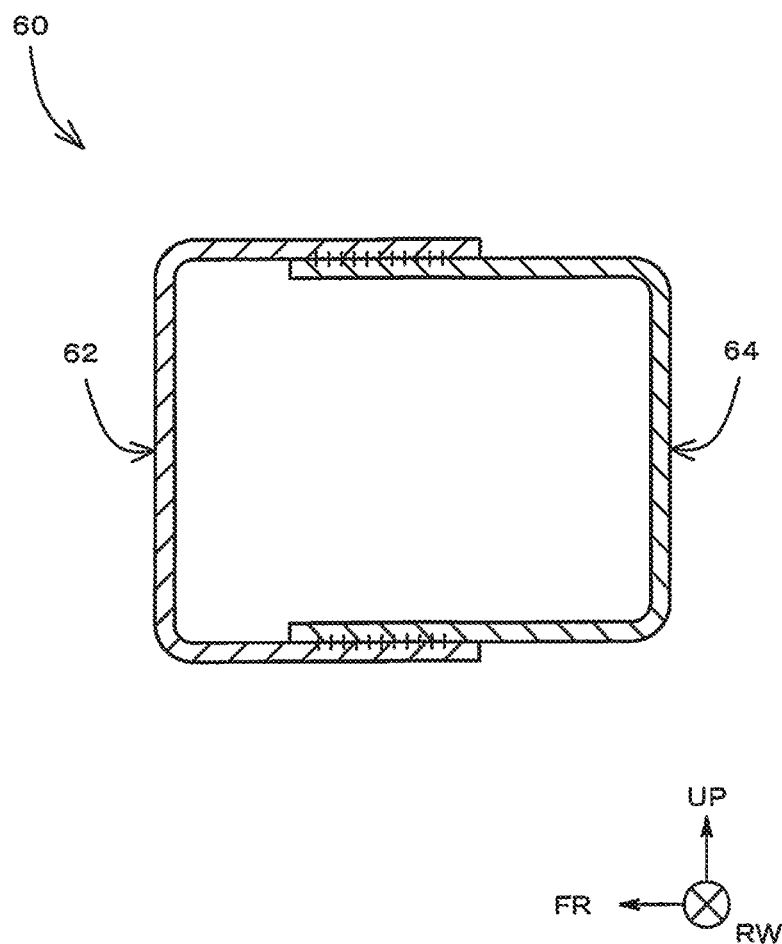
FIG. 4 is a cross-sectional view taken along line A-A in FIG. 2.
Figure 6:
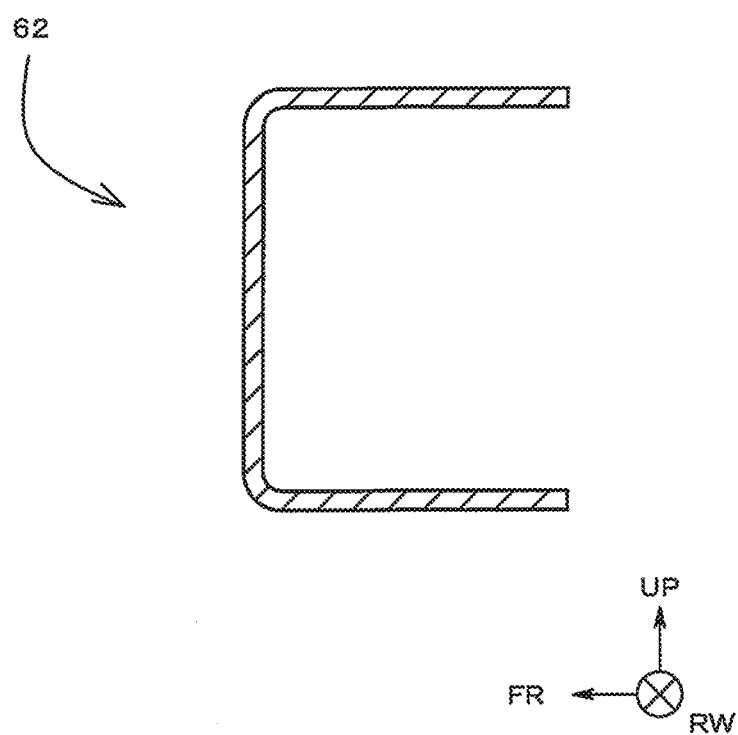
FIG. 6 is a cross-sectional view taken along line C-C in FIG. 2.

Referring to FIG. 6 that is a cross-sectional view taken along line C-C, the D seat first front beam 62 is formed of a member having a squarish U-shaped cross-section open toward the rear side in the vehicle front and rear direction. Referring to FIG. 4 that is a cross-sectional view taken along line A-A, an outer end portion of the D seat first front beam 62 in the vehicle width direction and an outer end portion of the D seat first rear beam 64 in the vehicle width direction are overlapped and joined to each other by welding or the like. In cross-sectional views taken along lines A-A to J-J, a portion where joining by welding or the like takes place is indicated by hatching with vertical lines (IIII).

Referring to FIG. 2, the D seat first front beam 62 extends, from the outer end portion in the vehicle width direction to the inner end portion in the vehicle width direction, while being inclined toward the front side in the vehicle front and rear direction relative to the vehicle width axis (RW axis in FIG. 2) in plan view. The inner end portion of the D seat first front beam 62 in the vehicle width direction is joined to the steering bracket 82.

The D seat first rear beam 64 is disposed further on the rear side than D seat first front beam 62 in the vehicle front and rear direction. Referring to FIG. 5 that is a cross-sectional view taken along line B-B, the D seat first rear beam 64 is formed of a member with a squarish U-shaped cross-section open toward the front side in the vehicle front and rear direction. Referring to FIG. 4 that is a cross-sectional view taken along line A-A, as described above, the outer end portion of the D seat first rear beam 64 in the vehicle width direction and the outer end portion of the D seat first front beam 62 in the vehicle width direction are overlapped and joined to each other by welding or the like.

A closed cross-sectional structure, as exemplarily illustrated in FIG. 4 which is the cross-sectional view taken along line A-A, is formed with the D seat first front beam 62 having a squarish U-shaped cross-section open toward the rear side in the vehicle front and rear direction and the D seat first rear beam 64 having a squarish U-shaped cross-section open toward the front side in the vehicle front and rear direction overlapped and joined to each other.

Referring to FIG. 2, the D seat first rear beam 64 extends from the outer end portion in the vehicle width direction to the inner end portion in the vehicle width direction while being inclined toward the rear side in the vehicle front and rear direction relative to the vehicle width axis (RW axis in FIG. 2) in plan view. Furthermore, the inner end portion of the D seat first rear beam 64 in the vehicle width direction and the outer end portion of the D seat second beam 70 in the vehicle width direction are overlapped and joined to each other by welding or the like.

Thus, in the D seat first beam 60, the D seat first front beam 62 and the D seat first rear beam 64, having their outer end portions in the vehicle width direction overlapped with each other, are arranged to be more separated from each other in the vehicle front and rear direction at a portion further on the inner side in the vehicle width direction. Thus, a so-called V-shaped structure is established to support the steering column 80.

Figure 10:
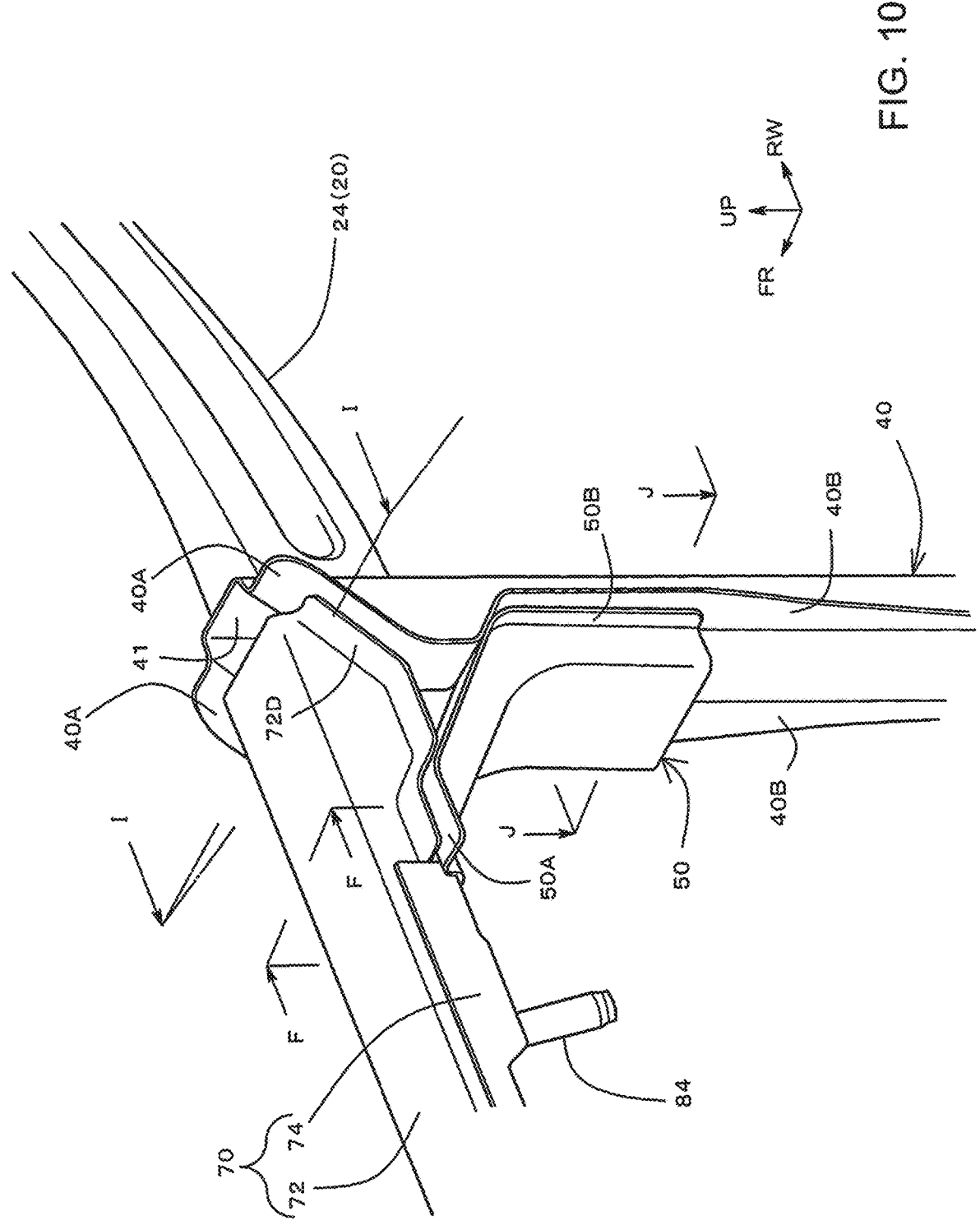
FIG. 10 is an enlarged perspective view exemplarily illustrating a portion where a D seat second upper beam, a floor brace, and a gusset in the steering support structure according to the present embodiment are joined to each other.

Referring to FIGS. 1 to 3, the D seat second beam 70 is disposed further on the inner side than the D seat first beam 60 in the vehicle width direction. The D seat second beam 70 has an outer end portion in the vehicle width direction joined to the D seat first rear beam 64. Referring to FIG. 10 described later, a D seat second upper beam 72 has an inner end portion in the vehicle width direction joined to the upper end of the floor brace 40 and the upper end of the gusset 50.

Referring to FIG. 2, the D seat second beam 70 is provided with a bent portion 71 on the inner side of the outer end portion in the vehicle width direction joined to the D seat first beam 60. The D seat second beam 70 extends in the vehicle width direction from the bent portion 71. Referring to FIGS. 1 and 2, this portion extending in the vehicle width direction serves as a column attachment portion 73.

Figure 7:
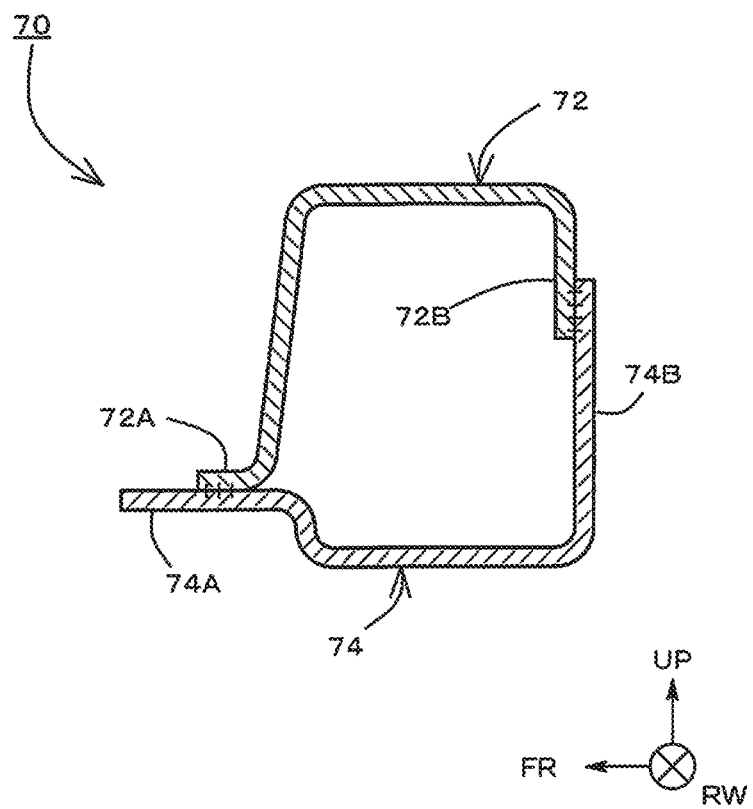
FIG. 7 is a cross-sectional view taken along line D-D in FIG. 2.

Referring to FIG. 3, the D seat second beam 70 includes the D seat second upper beam 72 which is an upper member and a D seat second lower beam 74 which is a lower member. With reference to FIG. 7 that is a cross-sectional view taken along line D-D, the D seat second upper beam 72 is formed to have a substantially squarish U shape open toward the lower side in the vehicle upper and lower direction. Furthermore, a flange 72A for joining is formed on the front side of the D seat second upper beam 72 in the vehicle front and rear direction. The D seat second lower beam 74 is formed in a substantially squarish U shape open toward the upper side in the vehicle upper and lower direction. Furthermore, a flange 74A for joining is formed on the front side of the D seat second lower beam 74 in the vehicle front and rear direction.

The flange 72A of the D seat second upper beam 72 and the flange 74A of the D seat second lower beam 74 are overlapped and joined to each other by welding or the like. Furthermore, a rear wall 72B of the D seat second upper beam 72 and a rear wall 74B of the D seat second lower beam 74 are overlapped and joined to each other by welding or the like. Thus, the D seat second beam 70 has a closed cross-sectional structure.

Thus, with the D seat second beam 70 including the column attachment portion 73 thus having the closed cross sectional shape, higher support rigidity can be achieved for the steering wheel 90 and the steering column 80 as compared with a configuration where the D seat second beam 70 has an open cross-sectional shape.

Figure 8:
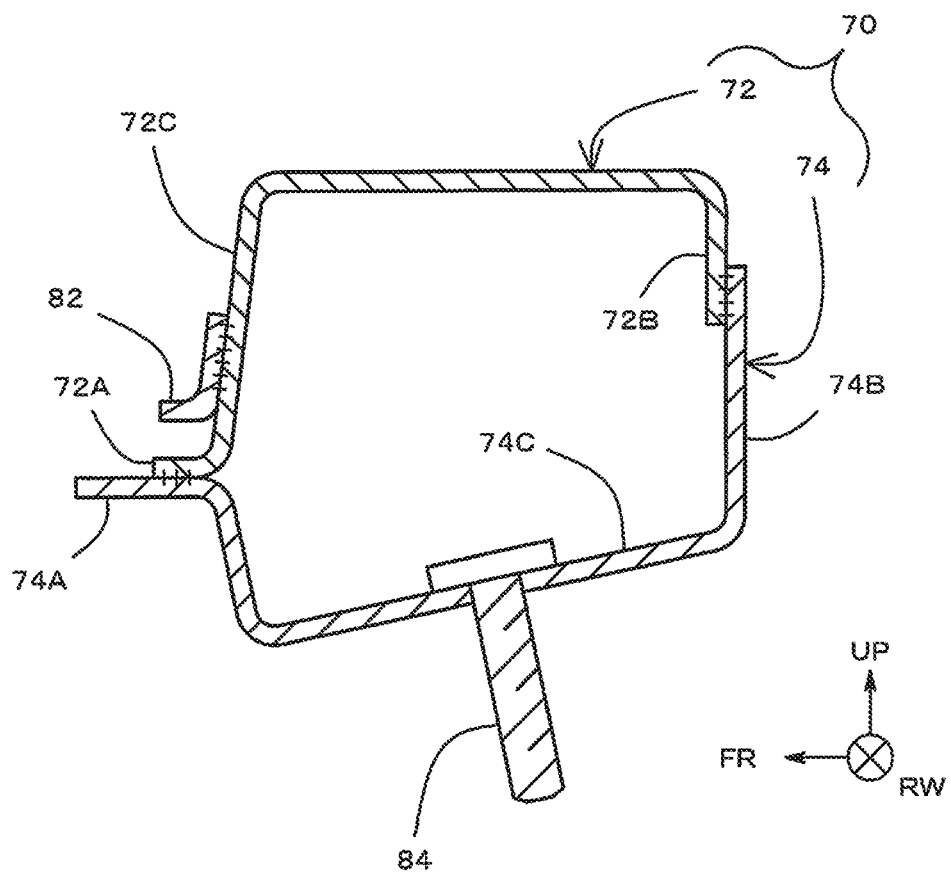
FIG. 8 is a cross-sectional view taken along line E-E in FIG. 2.

FIG. 8 is an exemplary cross-sectional view (cross-sectional view taken along line E-E) of the column attachment portion 73 which is the portion of the D seat second beam 70 extending in the vehicle width direction. The steering bracket 82 is joined to a front wall 72C of the D seat second upper beam 72 by welding or the like. Furthermore, a stud bolt 84 is provided through a lower wall 74C of the D seat second lower beam 74.

Referring to FIG. 1, the steering column 80 is attached to the instrument panel reinforcement 10; more specifically, to the column attachment portion 73 of the D seat second beam 70 via the stud bolts 84, 84 and the steering bracket 82.

FIG. 10 illustrates an example of a structure around the inner end portion of the D seat second beam 70 in the vehicle width direction. An inner end of the D seat second lower beam 74 in the vehicle width direction is positioned further on the inner side than an inner end of the D seat second upper beam 72 in the vehicle width direction. Thus, the D seat second upper beam 72 projects toward the inner side in the vehicle width direction beyond the D seat second lower beam 74.

A flange 72D facing the lower side in the vehicle upper and lower direction is formed in the projecting portion. The flange 72D extends substantially in the vehicle width direction, and has an outer portion, in the vehicle width direction, joined to an upper flange 50A of the gusset 50. Furthermore, the flange 72D has an inner portion, in the vehicle width direction, inclined in the vehicle width direction and in the vehicle upper and lower direction, and this inclined portion is joined to an inclined flange 40A of the floor brace 40.

Figure 11:
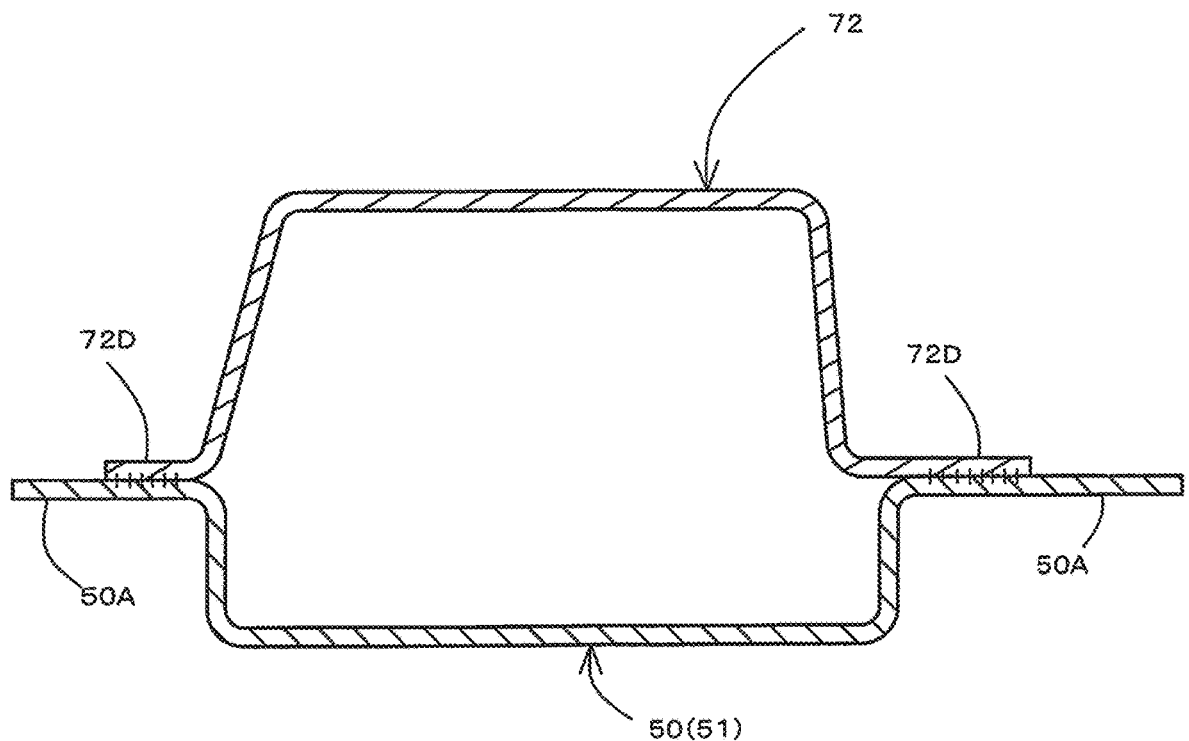
FIG. 11 is a cross-sectional view taken along line F-F in FIGS. 2 and 10.

As shown in FIG. 11 that is a cross-sectional view taken along line F-F, a closed cross-sectional structure is formed with the gusset 50 and the D seat second upper beam 72 joined to each other at the flange 72D and the upper flange 50A. The gusset 50 has a hat-shaped cross section open toward the upper side. The D seat second upper beam 72 has a hat-shaped cross section opened toward the lower side.

Figure 12:
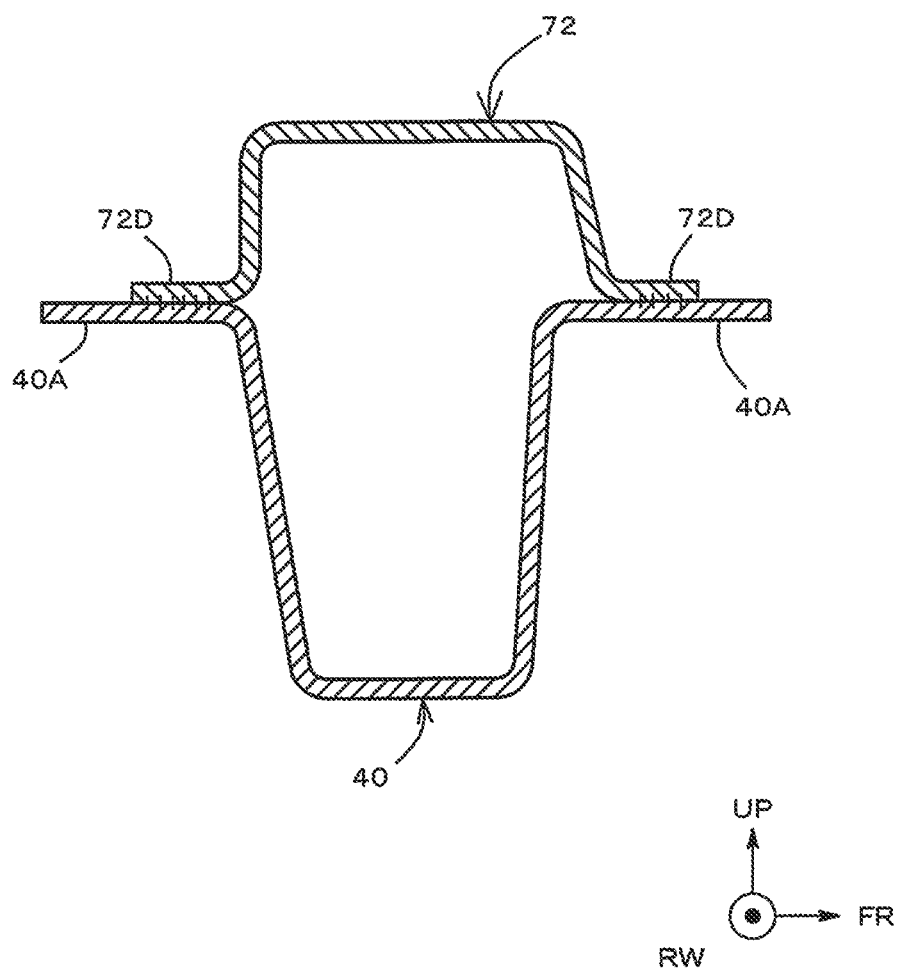
FIG. 12 is a cross-sectional view taken along line I-I in FIG. 10.

Similarly, as shown in FIG. 12 that is a cross-sectional view taken along line I-I, a closed cross-sectional structure is formed with the floor brace 40 and the D seat second upper beam 72 joined to each other at the flange 72D and the inclined flange 40A. The floor brace 40 has a hat-shaped cross section open toward the upper side. The D seat second upper beam 72 has a hat-shaped cross section opened toward the lower side.

Figure 9:
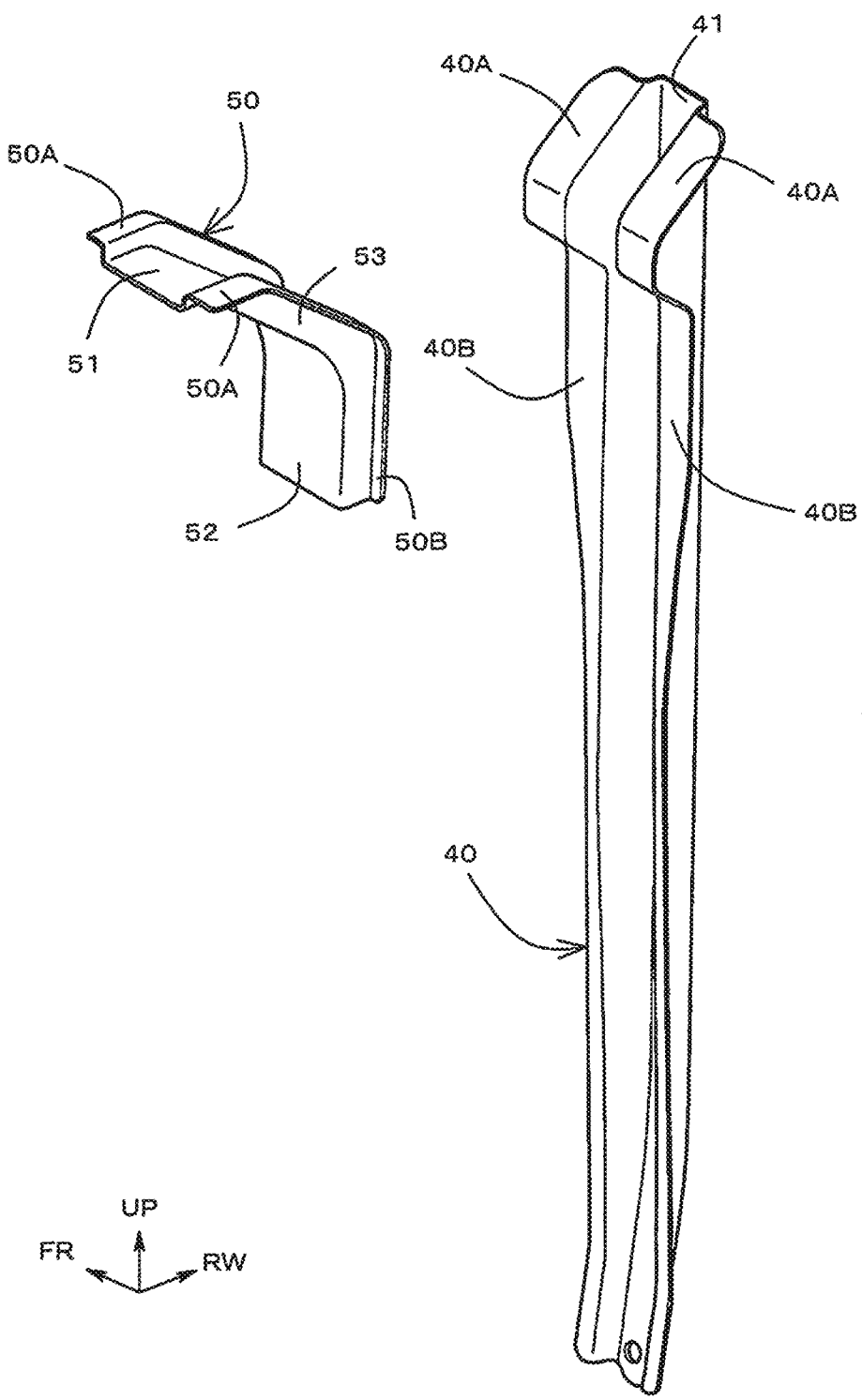
FIG. 9 is an exploded perspective view illustrating a floor brace and a gusset in the steering support structure according to the present embodiment.

FIG. 9 is an exemplary perspective view of the floor brace 40 and the gusset 50. Referring to FIG. 1, the floor brace 40 is a reinforcing member extending in the vehicle upper and lower direction, and has a ridgeline, where a load is mainly received (strut), extending in the vehicle upper and lower direction. The floor brace 40 has an upper end fixed to the D seat second beam 70 and the P seat beam 20. The floor brace 40 has a lower end fixed to a side wall 106A of a floor tunnel 106.

Referring to FIG. 9, the floor brace 40 has the upper end in the vehicle upper and lower direction formed to project in the vehicle width direction, and the inclined flanges 40A, 40A are formed along its ridgeline. Furthermore, vertical flanges 40B and 40B that face the vehicle width direction and extend in the vehicle upper and lower direction are formed further on the lower side than the projecting portion in the vehicle upper and lower direction.

The gusset 50 is a member for reinforcing the support structure including the D seat second beam 70 and the floor brace 40, and includes a horizontal portion 51 extending in the vehicle width direction, a vertical portion 52 extending in the vehicle upper and lower direction, and an inclined portion 53 that is provided between these portions and is inclined to extend in the vehicle width direction and in the vehicle upper and lower direction. Each of the horizontal portion 51, the vertical portion 52, and the inclined portion 53 is formed to have a hat-shaped cross section.

Figure 13:
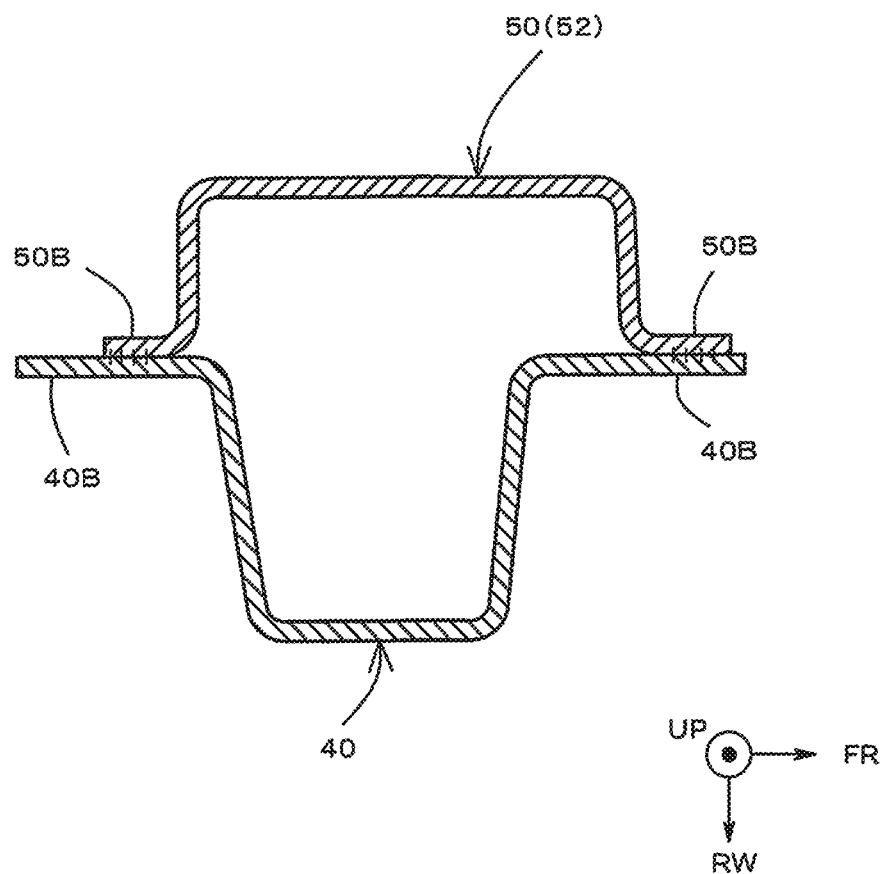
FIG. 13 is a cross-sectional view taken along line J-J in FIG. 10.

As described above, the upper flanges 50A, 50A of the horizontal portion 51 are joined to the flanges 72D, 72D of the D seat second upper beam 72. Referring to FIG. 13 illustrating an exemplary cross-sectional view taken along line J-J in FIG. 10, the vertical portion 52 of the gusset 50 and the floor brace 40 are joined to each other with lower flanges 50B, 50B overlapped with the vertical flanges 40B, 40B. The vertical portion 52 of the gusset 50 has a hat-shaped cross section open toward the left side in the vehicle width direction. The floor brace 40 has a hat-shaped cross section open toward the right side in the vehicle width direction. Thus, a closed cross-sectional structure is formed.

<Structure Around P Seat>

The structure around a passenger seat (P seat) of the instrument panel reinforcement 10 will be described by reference to FIGS. 14 to 17. The instrument panel reinforcement 10 includes the P seat beam 20 as a member around the P seat. In addition, the cowl to brace 30 is fixed to the P seat beam 20.

Figure 14:
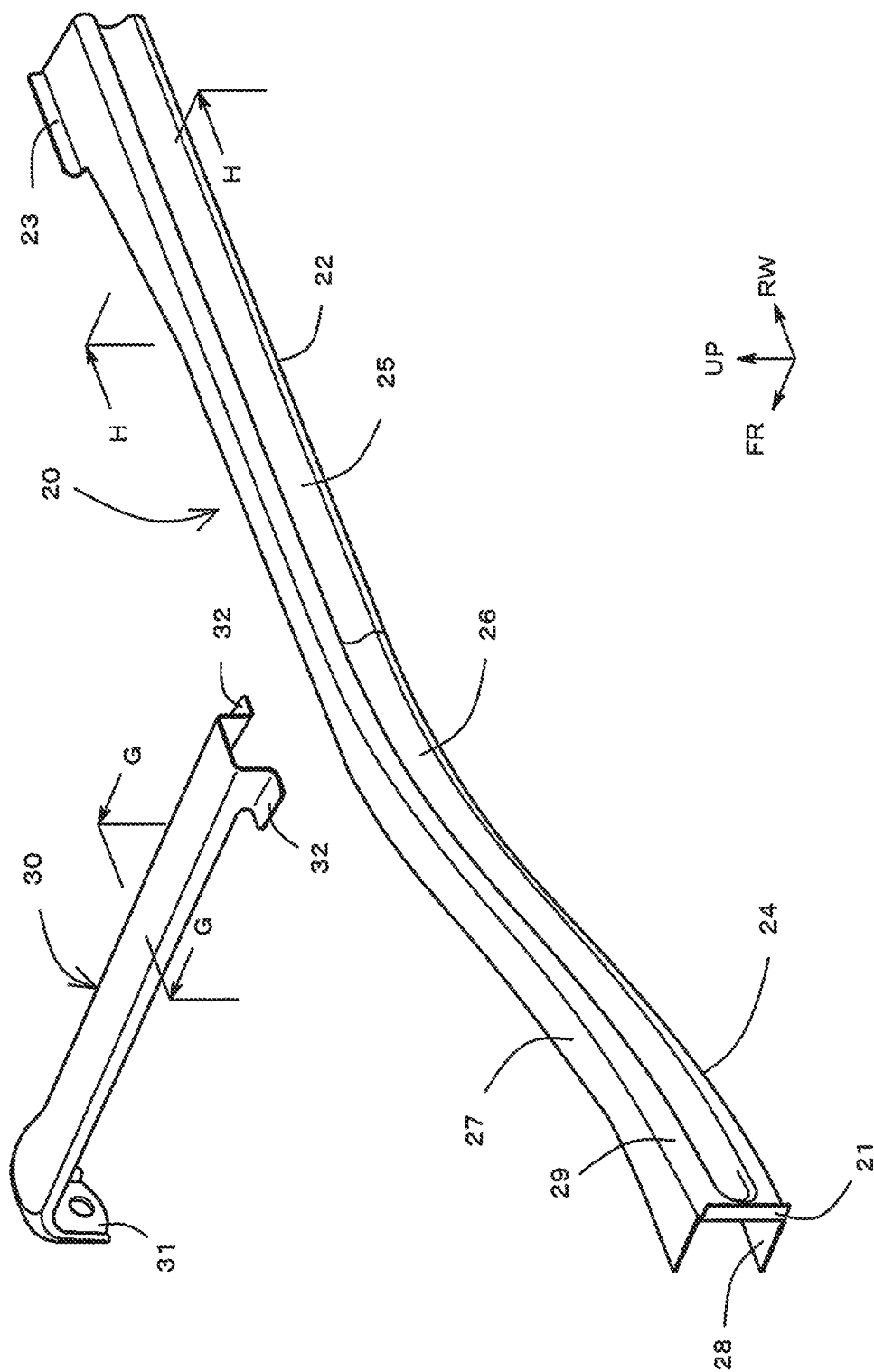
FIG. 14 is an exploded perspective view illustrating a P seat beam of an instrument panel reinforcement and a cowl to brace in the steering support structure according to the present embodiment.

Referring to FIGS. 1, 14, and 15, the cowl to brace 30 is a reinforcing member (brace) extending in the vehicle front and rear direction, and has a ridgeline, at which the load is mainly received (strut), extending substantially along the vehicle front and rear direction. The cowl to brace 30 has a front end fixed to a cowl panel 104 (see FIG. 1) serving as a panel member of the vehicle, and a rear end fixed to the P seat beam 20. As will be described later, the cowl to brace 30 has a rear end fixed to the P seat beam 20 at the bent portion 26 of the P seat beam 20.

The brace member fixed to the P seat beam 20 may not be the cowl to brace 30, and may be a dash to brace that has a front end fixed to a dash panel (not illustrated) provided below the cowl panel 104 and extends in the vehicle front and rear direction. In this configuration, the dash to brace also extends in the vehicle front and rear direction and has a rear end fixed to the bent portion 26 of the P seat beam 20, as in the case of the cowl to brace 30.

FIG. 15 is an exemplary cross-sectional view of the cowl to brace 30 taken along line G-G. The cowl to brace 30 is a member having a squarish U-shaped cross section open toward the lower side in the vehicle upper and lower direction, and has a front flange 31 (see FIG. 14), facing the vehicle front and rear direction, formed at the front end. Rear flanges 32, 32 facing the vehicle upper and lower direction are formed at the rear end. The front flange 31 and the cowl panel 104 (see FIG. 1) are fastened to each other by fastening means such as a bolt and nut. The rear flanges 32, 32 and an upper wall portion 27 (see FIG. 16) of the P seat beam 20 are joined to each other by welding or the like.

Referring to FIG. 14, the P seat beam 20 extends substantially in the vehicle width direction, with a ridgeline, where a load is mainly received (strut), extending substantially in the vehicle width direction. FIG. 16 illustrates an exemplary cross-sectional view taken along line H-H in FIGS. 2 and 14. The P seat beam 20 is a member having a squarish U-shaped cross section open toward the front side in the vehicle front and rear direction, and includes the upper wall portion 27 that extends in the vehicle front and rear direction and is provided on the upper side in the vehicle upper and lower direction, and a lower wall portion 28 that similarly extends in the vehicle front and rear direction and is provided on the lower side in the vehicle upper and lower direction. Furthermore, a side wall portion 29 is provided that extends in the vehicle upper and lower direction and connects the upper wall portion 27 and the lower wall portion 28 to each other.

Referring to FIG. 14, a bead 25 is formed entirely over the side wall portion 29 in the vehicle width direction. As exemplarily illustrated in FIG. 16, the bead 25 is a recess that protrudes toward the front side in the vehicle front and rear direction from the side wall portion 29. With the bead 25 formed, a ridgeline extending in the vehicle width direction is formed on the side wall portion 29, whereby rigidity in the vehicle width direction is improved.

Referring to FIG. 14, an inner flange 21 facing the vehicle width direction is formed at an inner end portion of the side wall portion 29 of the P seat beam 20 in the vehicle width direction. The inner flange 21 is joined to a bottom wall portion 41 (see FIG. 10) of the floor brace 40 by welding or the like. As described above, the inclined flange 40A of the floor brace 40 and the flange 72D of the D seat second upper beam 72 are joined to each other. Thus, the P seat beam 20 and the D seat second beam 70 are connected to each other via the floor brace 40.

Referring to FIG. 14, outer flanges 23 facing the vehicle front and rear direction are formed at outer end portions of the upper wall portion 27 and the lower wall portion 28 of the P seat beam 20 in the vehicle width direction. Referring to FIG. 1, the P seat beam 20 is fixed to the front lower pillar 100B via the outer flange 23 and the pillar bracket 102B.

The side end portion 22 and the inclined portion 24 are respectively formed on the outer and the inner sides of the P seat beam 20 in the vehicle width direction. Furthermore, the bent portion 26 is formed in the P seat beam 20 to serve as a boundary part between the side end portion 22 and the inclined portion 24. For example, the side end portion 22 and the inclined portion 24 may be formed to substantially divide the P seat beam 20 in two in the vehicle width direction.

The side end portion 22 extends in the vehicle width direction, and has the outer flange 23, provided at the outer end of the side end portion 22 in the vehicle width direction, fixed to the front lower pillar 100B serving as a frame member via the pillar bracket 102B.

The inclined portion 24 is provided between the side end portion 22 and the column attachment portion 73 of the D seat second beam 70. Thus, the inclined portion 24 extends (in an inclined manner) toward the inner side in the vehicle width direction and toward the rear side in the vehicle front and rear direction from the bent portion 26 at the inner end of the side end portion 22 in the vehicle width direction, and has the inner flange 21 (see FIG. 14), provided to an end of the inclined portion 24 in the vehicle width direction, connected to the column attachment portion 73 of the D seat second beam 70 via the floor brace 40.

The P seat beam 20 is formed of a single member, whereas the D seat side of the instrument panel reinforcement 10 is segmented into a plurality of parts such as the D seat first beam 60 (the D seat first front beam 62 and the D seat first rear beam 64) and the D seat second beam 70 (the D seat second upper beam 72 and the D seat second lower beam 74). Specifically, the inclined portion 24 and the side end portion 22 as well as the bent portion 26 are parts of a single member having a squarish U-shaped cross section.

For example, the P seat beam 20 is formed by die-casting (casting) a metal material such as aluminum. The P seat beam 20 is a member having a squarish U-shaped cross section, and thus can be formed as the P seat beam 20 including the bent portion 26 to have a bent shape, with the die cast mold formed to have the bent shape.

On the other hand, in conventional cases where the instrument panel reinforcement is formed of a pipe tube having a circular cross section, a process of bending the pipe tube is required to form the bent portion 26, and this process needs to be performed precisely so that crushing of the tube can be prevented. The P seat beam 20 according to the present embodiment does not require such a high-precision process, and thus can be produced at a relatively low cost.

Referring to FIGS. 2 and 14, the rear end of the cowl to brace 30 is joined and fixed to the bent portion 26 of the P seat beam 20 by welding or the like. In other words, the cowl to brace 30 extending in the vehicle front and rear direction is joined to the bent portion 26 of the P seat beam 20 that has a boomerang-like shape in plan view and includes the side end portion 22 extending in the vehicle width direction and the inclined portion 24 inclined relative to the side end portion 22.

The side end portion 22, the inclined portion 24, and the cowl to brace 30 are not parallel to each other, and the cowl to brace 30 is joined at the bent portion 26 serving as a boundary part between the side end portion 22 and the inclined portion 24. Thus, a so-called Y-shaped structure is established. In the Y-type structure, a load input from any of the three branches is distributed to the remaining two branches.

Now, referring to FIG. 2, in the instrument panel reinforcement 10 according to the present embodiment, the inclined portion 24 extends in a direction closer to the vehicle width axis RW than to the vehicle longitudinal axis FR in plan view. With this configuration, the load input to the inclined portion 24 is distributed to the cowl to brace 30 and to the side end portion 22, with a larger component force input to the side end portion 22.

As described above, the cowl to brace 30 is fixed to the cowl panel 104 (see FIG. 1) which is a panel member of a vehicle, and a load input to the cowl to brace 30 is transmitted to the cowl panel 104. On the other hand, the side end portion 22 is fixed to the front lower pillar 100B serving as a frame member of the vehicle, and a load input to the side end portion 22 is transmitted to the front lower pillar 100B.

Since the front lower pillar 100B serving as a frame member has higher rigidity than the cowl panel 104 serving as a panel member, more load may be delivered to the front lower pillar 100B. Thus, in the present embodiment, the inclined portion 24 extends in the direction closer to the vehicle width axis RW, so that larger component force is input in the vehicle width direction; that is, input to the side end portion 22, than that input to the cowl to brace 30.

<Behavior at the Time of Load Input>

Figure 17:
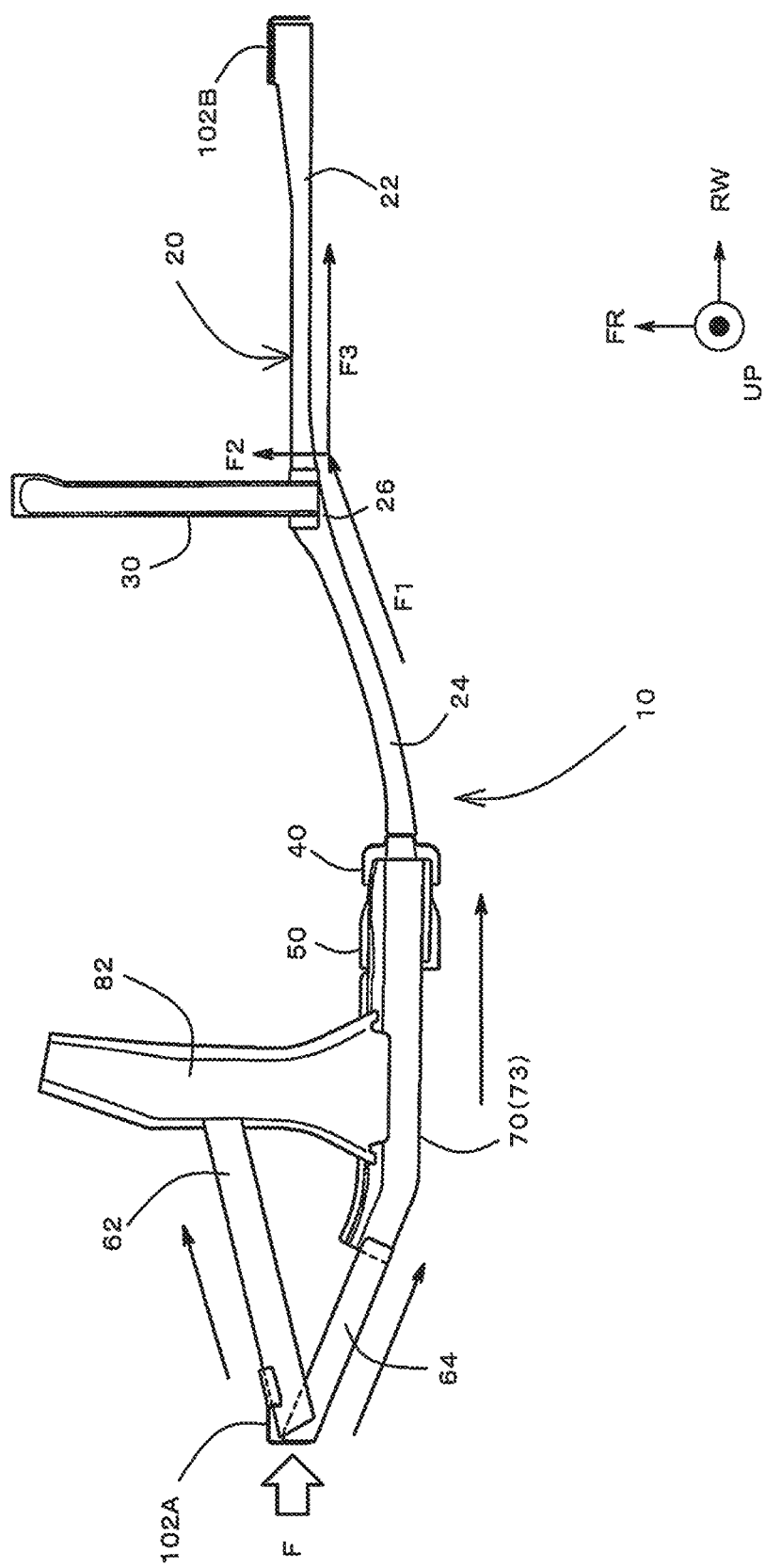
FIG. 17 is a plan view illustrating a transfer path of a load in the vehicle width direction input to the instrument panel reinforcement according to the present embodiment.
Figure 18:
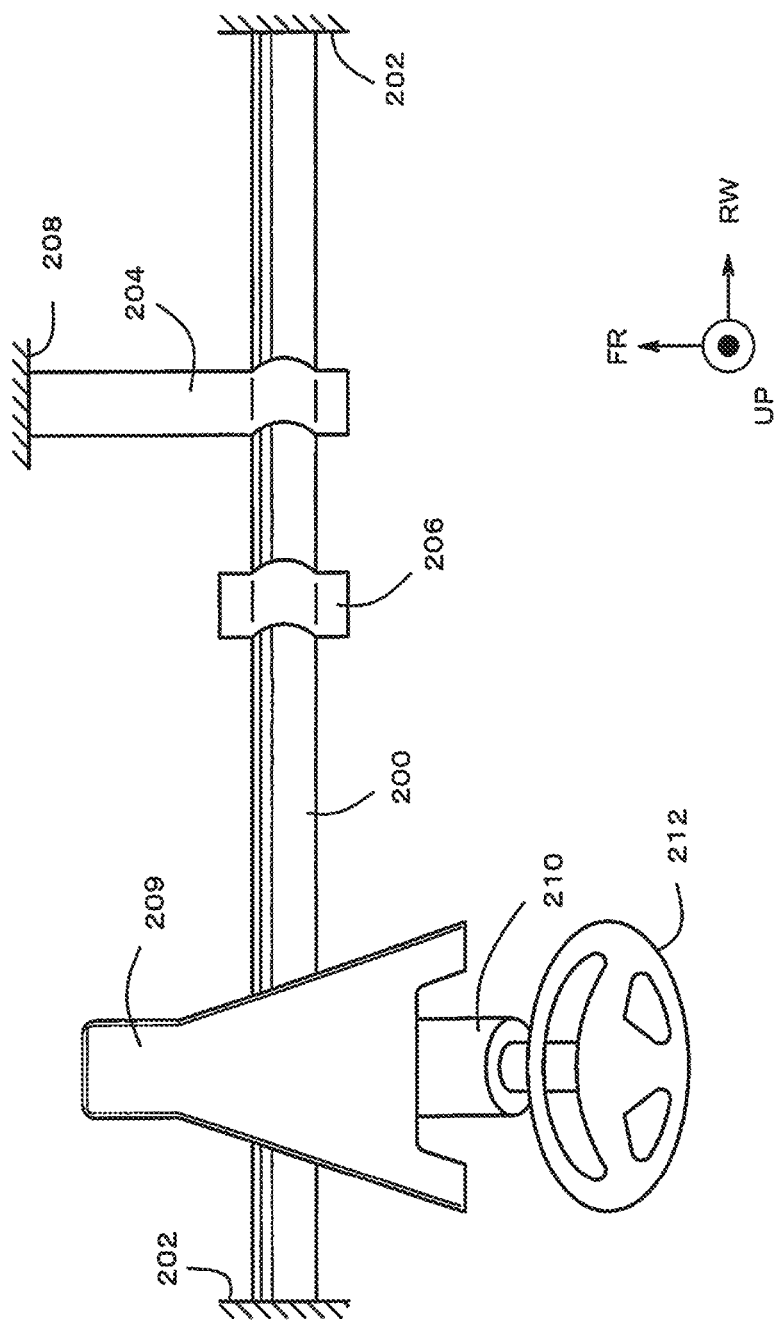
FIG. 18 is a plan view illustrating a conventional steering support structure.

FIG. 17 illustrates a behavior of the steering support structure according to the present embodiment at the time of load input. When a load F in the vehicle width direction is input from the pillar bracket 102A, the instrument panel reinforcement 10 mainly resists (struts) the load F to prevent the steering wheel 90 (see FIG. 1) from swinging in the vehicle width direction.

Specifically, the load F is input from the pillar bracket 102A to the D seat first rear beam 64. Furthermore, the load F is also partially distributed to the D seat first front beam 62. Furthermore, the load input to the D seat first rear beam 64 reaches the inclined portion 24 of the P seat beam 20 via the D seat second beam 70.

The load F1 input to the inclined portion 24 is branched at the bent portion 26 to be distributed to the cowl to brace 30 and to the side end portion 22. In other words, when the initial load F is input to the pillar bracket 102A, component force F3 thereof is input to the side end portion 22. Therefore, even if the initial load F exceeds the load capacity of the side end portion 22, the component force F3, which is smaller than the initial load F, is input to the side end portion 22, whereby buckling deformation of the side end portion 22 can be prevented.

The component force F2 and the component force F3 to the cowl to brace 30 and the side end portion 22 are determined in accordance with angles of the inclined portion 24, the side end portion 22, and the cowl to brace 30 relative to each other as described above. Specifically, the inclined portion 24 extends in a direction closer to the vehicle width axis RW than to the vehicle longitudinal axis FR, and thus the component force F3 input to the side end portion 22 extending to the vehicle width direction is larger than the component force F2 input to the cowl to brace 30 extending in the vehicle front and rear direction.

As described above, the cowl to brace 30 is fixed to the cowl panel 104 (see FIG. 1) serving as a panel member of the vehicle. On the other hand, the side end portion 22 is fixed to the front lower pillar 100B serving as a frame member of the vehicle. Since the front lower pillar 100B serving as a frame member has higher rigidity than the cowl panel 104 serving as a panel member, more load may be delivered to the front lower pillar 100B. Thus, in the present embodiment, the inclined portion 24 extends in the direction closer to the vehicle width axis RW, so that larger component force is input in the vehicle width direction; that is, is input to the side end portion 22, than that input to the cowl to brace 30.

As described above, with the steering support structure according to the present embodiment, the load input to the instrument panel reinforcement 10 is distributed to the side end portion 22 and to the cowl to brace 30. Thus, even if a load exceeding the load capacity of the side end portion 22 is input to the instrument panel reinforcement 10, buckling deformation of the side end portion 22 can be prevented. As described above, with the steering support structure according to the present embodiment, the support rigidity of the steering wheel 90 is improved particularly in the vehicle width direction.

The present disclosure is not limited to the present embodiments described above, and includes all changes and modifications without departing from the technical scope or the essence of the present disclosure defined by the claims.

The invention claimed is:

1. A steering support structure comprising:
an instrument panel reinforcement that supports a steering column and has both ends in a vehicle width direction fixed to frame members of a vehicle; and a brace that extends in a vehicle front and rear direction and has a front end fixed to a panel member of a vehicle body and a rear end fixed to the instrument panel reinforcement, wherein the instrument panel reinforcement includes a column attachment portion to which the steering column is attached, the column attachment portion extending in the vehicle width direction, a side end portion that extends in the vehicle width direction and has an outer end in the vehicle width direction fixed to one of the frame members, and an inclined portion that is provided between the column attachment portion and the side end portion, extends toward an inner side in the vehicle width direction and toward a rear side in the vehicle front and rear direction from a bent portion at an inner end in the vehicle width direction of the side end portion, and is connected to the column attachment portion, and wherein the brace has a rear end fixed to the bent portion of the instrument panel reinforcement.

2. The steering support structure according to claim 1, wherein the inclined portion of the instrument panel reinforcement extends in a direction closer to a vehicle width axis than to a vehicle longitudinal axis in plan view.

3. The steering support structure according to claim 1, wherein the inclined portion and the side end portion of the instrument panel reinforcement as well as the bent portion are parts of a single member having a squarish U-shaped cross section.

4. The steering support structure according to claim 2, wherein the inclined portion and the side end portion of the instrument panel reinforcement as well as the bent portion are parts of a single member having a squarish U-shaped cross section.

* * * * *